United States Patent
Ito et al.

(10) Patent No.: US 7,261,322 B2
(45) Date of Patent: Aug. 28, 2007

(54) COUPLING STRUCTURE OF SIDE MEMBER TO CROSS MEMBER

(75) Inventors: Jun Ito, Kanagawa (JP); Fumitaka Matsumoto, Kanagawa (JP); Masanobu Saito, Kanagawa (JP); Hiroshi Sato, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 351 days.

(21) Appl. No.: 10/506,546

(22) PCT Filed: Mar. 4, 2003

(86) PCT No.: PCT/JP03/02473

§ 371 (c)(1),
(2), (4) Date: Jan. 14, 2005

(87) PCT Pub. No.: WO03/074346

PCT Pub. Date: Sep. 12, 2003

(65) Prior Publication Data

US 2005/0116459 A1 Jun. 2, 2005

(30) Foreign Application Priority Data

Mar. 5, 2002 (JP) ............................. 2002-058855

(51) Int. Cl.
*B62D 21/02* (2006.01)
*B62D 21/11* (2006.01)

(52) U.S. Cl. ...................... 280/781; 280/795
(58) Field of Classification Search ............... 280/781, 280/785, 788, 795; 296/29; 403/DIG. 15; 52/737.6, 740.2
See application file for complete search history.

(56) References Cited

U.S. PATENT DOCUMENTS 1,841,510 A * 1/1932 Ranst ........................ 280/794
2,165,074 A * 7/1939 Sherman .................... 280/800
2,843,231 A * 7/1958 Maruhn ..................... 403/187

(Continued)

FOREIGN PATENT DOCUMENTS

CN 1218751 A 6/1999

(Continued)

*Primary Examiner*—Paul N. Dickson
*Assistant Examiner*—Joseph Rocca
(74) *Attorney, Agent, or Firm*—Sughrue Mion, PLLC (57) ABSTRACT

A leaf spring bracket is fixed to an outer surface of a vertical wall of a side member in a vehicle transverse direction by use of rivets penetrating the vertical wall. A gusset which couples an end of a cross member in the vehicle transverse direction with the side member has a vertical plate and upper and lower horizontal plates. The vertical plate is fixed to the vertical wall of the side member. The upper and lower horizontal plates extend inward in the vehicle transverse direction from upper and lower ends of the vertical plate, respectively, and are fixed to upper and lower walls of the cross member, respectively. The vertical plate has ribs protruding inward in the vehicle transverse direction. The ribs form and define recessed parts in an outer surface of the vertical plate in the vehicle transverse direction. Parts of the rivets, which project from an inner surface of the vertical wall in the vehicle transverse direction, are housed in the recessed parts. Thus, the vertical plate is fixed in a state of coming into surface contact with the inner surface of the vertical wall in the vehicle transverse direction.

4 Claims, 4 Drawing Sheets

U.S. PATENT DOCUMENTS

| | | | | |
|---|---|---|---|---|
| 5,308,115 A | * | 5/1994 | Ruehl et al. | 280/785 |
| 5,634,663 A | * | 6/1997 | Krupp et al. | 280/800 |
| 5,725,247 A | * | 3/1998 | Nilsson et al. | 280/781 |
| 6,330,778 B1 | * | 12/2001 | Jakobsson | 52/729.1 |
| 6,398,260 B1 | * | 6/2002 | Rinehart | 280/781 |
| 6,398,261 B1 | * | 6/2002 | Ammer et al. | 280/781 |
| 6,561,574 B1 | * | 5/2003 | Logan et al. | 296/204 |

FOREIGN PATENT DOCUMENTS

| | | |
|---|---|---|
| DE | 19625380 A1 | 6/1996 |
| JP | 58-3375 U | 1/1983 |
| JP | 2-112582 U | 9/1990 |
| JP | 4-15871 U | 4/1992 |
| JP | 04-51871 U | 4/1992 |
| JP | 05-58569 U | 8/1993 |
| JP | 5-58569 U | 8/1993 |
| JP | 6-298119 A | 10/1994 |
| JP | 7-7261 Y2 | 2/1995 |
| JP | 8-5402 B2 | 1/1996 |
| JP | 8-29721 B2 | 3/1996 |
| JP | 2500718 Y2 | 3/1996 |
| JP | 8-282533 A | 10/1996 |
| JP | 2571568 B2 | 10/1996 |
| JP | 9-506055 A | 6/1997 |
| JP | 10-297525 | 10/1998 |
| JP | 10338160 A | 12/1998 |
| JP | 2593019 Y2 | 1/1999 |
| JP | 2000-309282 A | 11/2000 |
| JP | 3195910 B2 | 6/2001 |

* cited by examiner

COUPLING STRUCTURE OF SIDE MEMBER TO CROSS MEMBER

This is a National Stage Application of International Application No. PCT/JP03/02473 filed Mar. 4, 2003.

TECHNICAL FIELD

The present invention relates to a coupling structure of side and cross members which form a chassis frame of a-vehicle body.

BACKGROUND ART

There has been heretofore known a structure for coupling a side member disposed in a longitudinal direction of a vehicle body to a cross member disposed in a transverse direction of a vehicle body by use of a gusset (as the prior art, see Japanese Utility Model Laid-Open Nos. H5 (1993)-58569 and H4 (1992)-51871).

Figure 5A:
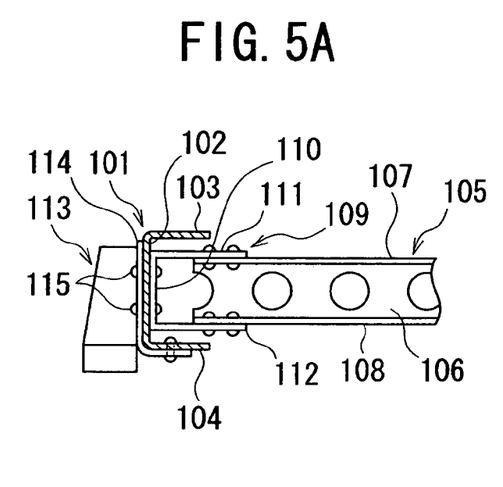
FIG. 5A is a cross-sectional view of a main part, showing a conventional coupling structure.
Figure 5B:
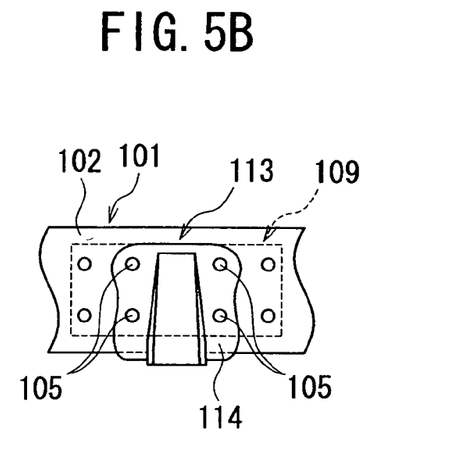
FIG. 5B is a side view of FIG. 5A.

For example, as shown in FIGS. 5A and 5B, a side member 101 has an approximately U-shaped cross section including a vertical wall 102 and upper and lower horizontal walls 103 and 104. The upper and lower horizontal walls 103 and 104 are bent from upper and lower ends of the vertical wall 102, respectively, and extend inward in a vehicle transverse direction. A cross member 105 has an approximately U-shaped cross section including a side wall 106, an upper wall 107 and a lower wall 108. The upper and lower walls 107 and 108 are bent from upper and lower ends of the side wall 106, respectively, and extend toward one end in a longitudinal direction of a vehicle body. A gusset 109 has a vertical plate 110 and upper and lower horizontal plates 111 and 112. The vertical plate 110 is fixed to the vertical wall 102 of the side member 101. The upper and lower horizontal plates 111 and 112 are bent from upper and lower ends of the vertical plate 110, respectively, and extend inward in the vehicle transverse direction. The upper and lower horizontal plates 111 and 112 are fixed to the upper and lower walls 107 and 108 of the cross member 105, respectively.

The upper and lower horizontal walls 103 and 104 of the side member 101 and the upper and lower walls 107 and 108 of the cross member 105 are not directly coupled together by use of rivets or the like but are coupled together by use of the gusset 109. Thus, there exist no rivets or the like, which project from upper and lower surfaces of the upper and lower horizontal walls 103 and 104 of the side member 101. Accordingly, the upper and lower surfaces of the horizontal walls 103 and 104 can be maintained in a flat state. Consequently, it is possible to effectively utilize a space in a vehicle height direction.

On an outer surface of the vertical wall 102 of the side member 101 in the vehicle transverse direction, a mounting plate part 114 of a leaf spring bracket 113 for supporting a suspension mechanism (not shown) is fixed. Thus, the leaf spring bracket 113 is fixed to a coupled portion of the side and cross members 101 and 105. This is in order to securely support the suspension mechanism by dispersing load acting thereon to the side and cross members 101 and 105.

Moreover, it is required to firmly support the gusset 109 by use of the side member 101. Thus, the vertical plate 110 of the gusset 109 is fixed to the vertical wall 102 of the side member 101 in a state of coming into surface contact with an inner surface of the vertical wall 102 in the vehicle transverse direction. Consequently, it is structurally difficult to fix the gusset 109 and the leaf spring bracket 113, which are disposed so as to face each other while sandwiching the side member 101 therebetween, to the vertical wall 102 individually. For example, when the gusset 109 is fixed to the vertical wall 102 of the side member 101 after fixing the leaf spring bracket 113 to the vertical wall 102 by use of the rivets, parts of the rivets fixing the leaf spring bracket 113, the parts projecting from the inner surface of the vertical wall 102 in the vehicle transverse direction, interfere with the vertical plate 110 of the gusset 109. Thus, the surface contact state of the vertical plate 110 and the vertical wall 102 of the side member 101 cannot be obtained. From the above-described reason, the mounting plate part 114 of the leaf spring bracket 113 is fixed to the vertical wall 102 of the side member 101 by use of rivets 115 for fixing the vertical plate 110 of the gusset 109.

However, as described above, in the structure in which the vertical plate 110 of the gusset 109 and the mounting plate part 114 of the leaf spring bracket 113 are fastened together by use of the common rivets 115 and fixed to the vertical wall 102 of the side member 101, it is required to assemble these three members while simultaneously positioning the members. Thus, an assembly operation thereof is complicated.

As a structure for solving the inconvenience described above, for example, as shown in FIGS. 6A and 6B, there is one in which a gusset 116 is formed of an upper gusset 117 and a lower gusset 118.

Figure 6A:
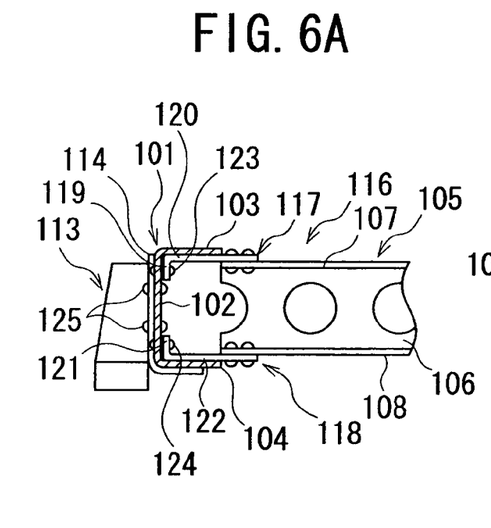
FIG. 6A is a cross-sectional view of a main part, showing another conventional coupling structure.
Figure 6B:
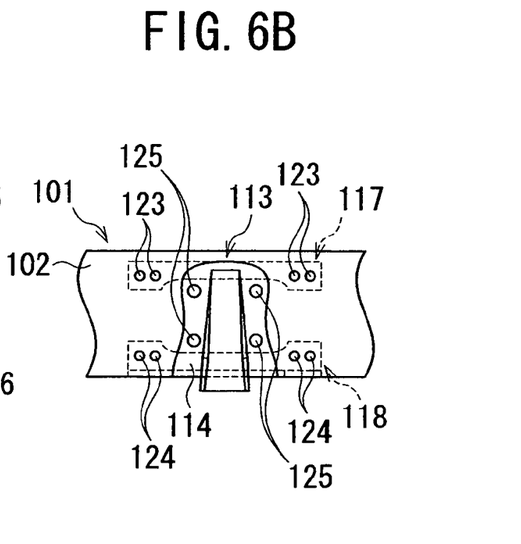
FIG. 6B is a side view of FIG. 6A.

The upper gusset 117 has an upper vertical plate 119 and an upper horizontal plate 120. The upper vertical plate 119 is fixed to the vertical wall 102 of the side member 101. The upper horizontal plate 120 is bent from an upper end of the upper vertical plate 119, extends inward in the vehicle transverse direction, and is fixed to the upper wall 107 of the cross member 105. The lower gusset 118 has a lower vertical plate 121 and a lower horizontal plate 122. The lower vertical plate 121 is fixed to the vertical wall 102 of the side member 101. The lower horizontal plate 122 is bent from a lower end of the lower vertical plate 121, extends inward in the vehicle transverse direction, and is fixed to the lower wall 108 of the cross member 105. The upper and lower horizontal plates 120 and 122 of the gusset 116 are fixed to the vertical wall 102 of the side member 101 by use of dedicated rivets 123 and 124, respectively. The mounting horizontal plate 114 of the leaf spring bracket 113 is fixed to the vertical wall 102 of the side member by use of dedicated rivets 125 disposed between the upper and lower horizontal plates 120 and 122.

According to the foregoing configuration, the upper and lower gussets 117 and 118 are each fixed to the cross member 105 in advance, and the leaf spring bracket 113 is fixed to the side member 101 by use of the rivets 125. Thereafter, the upper and lower gussets 117 and 118 are fixed to the side member 101 by use of the rivets 123 and 124, respectively. Specifically, after the cross member 105 and the upper and lower gussets 117 and 118 are assembled as one unit and the side member 101 and the leaf spring bracket 113 are assembled as one unit, the both units can be combined together. Therefore, compared to the case where the three members are simultaneously assembled as shown in FIGS. 5A and 5B, assembly workability is more improved.

However, in the case where the gusset 116 is formed of two separate components of the upper gusset 117 and the lower gusset 118 as shown in FIGS. 6A and 6B, it is undeniable that rigidity of the gusset 116 is lowered compared to the case of using the one gusset 109 as shown in FIGS. 5A and 5B. Therefore, in order to ensure rigidity in the coupled portion of the side and cross members 101 and 105, particularly, torsional rigidity in a direction of rotation about the cross member 105, reinforcing members may be required additionally. Thus, an increase in the number of components, an increase in weight and a complication of the structure and the like may be induced.

The present invention was made in consideration of the circumstances described above. An object of the present invention is to provide a coupling structure of side and cross members, which is capable of providing sufficient rigidity without inducing an increase in weight and a complication of the structure and provides excellent assembly workability.

DISCLOSURE OF THE INVENTION

In order to achieve the foregoing object, a coupling structure according to the present invention includes: a side member, a cross member and a gusset. The side member has a vertical wall and is disposed along a longitudinal direction of a vehicle body. On an outer surface of the vertical wall of the side member in a vehicle transverse direction, a component such as a leaf spring bracket is fixed by use of attachment members penetrating the vertical wall. The cross member is disposed in the vehicle transverse direction, and has a side wall and upper and lower walls which extend from upper and lower ends of the side wall, respectively. The gusset has a vertical plate fixed to the vertical wall of the side member, and upper and lower horizontal plates which extend inward in the vehicle transverse direction from upper and lower ends of the vertical plate and are fixed to the upper and lower walls of the cross member, respectively. The gusset couples an end of the cross member in the vehicle transverse direction to the side member. The vertical plate of the gusset has ribs protruding inward in the vehicle transverse direction. The ribs form and define recessed parts on an outer surface of the vertical plate in the vehicle transverse direction. Parts of the attachment members, which project from an inner surface of the vertical wall of the side member in the vehicle transverse direction, are housed in the recessed parts defined by the ribs. Thus, the vertical plate of the gusset is fixed in a state of coming into surface contact with the inner surface of the vertical wall of the side member in the vehicle transverse direction.

In order to obtain the foregoing coupling structure, the gusset is fixed to the cross member in advance and the component is fixed to the side member by use of the attachment members. Thereafter, the gusset is fixed to the side member. In this event, the parts of the attachment members, which project from the inner surface of the vertical wall of the side member in the vehicle transverse direction, are housed in the recessed parts formed by the ribs. Thus, the vertical plate of the gusset comes into surface contact with the inner surface of the vertical wall of the side member in the vehicle transverse direction without interfering with the attachment members. Therefore, a strong fixation state is obtained between the gusset and the side member. Specifically, after the cross member and the gusset are assembled as one unit and the side member and the component are assembled as one unit, the both units can be assembled together. Thus, assembly workability is improved.

Moreover, the side member is coupled to the cross member by use of one gusset and the vertical plate of the gusset is reinforced by the ribs. Thus, without additionally requiring reinforcing members, it is possible to increase rigidity in a coupled portion of the side and cross members, particularly, torsional rigidity in a direction of rotation about the cross member.

In the coupling structure described above, second ribs may be provided in the gusset by providing a horizontal wall in the side member and fixing the component also to the horizontal wall by use of second attachment members. The horizontal wall extends inward in the vehicle transverse direction from one of upper and lower ends of the vertical wall and faces one of upper and lower horizontal plates of the gusset. The second attachment members penetrate the horizontal wall of the side member. The second ribs are formed in one of the horizontal plates of the gusset and protrude in an opposite direction to the horizontal wall of the side member. The second ribs form and define second recessed parts on a surface facing the horizontal wall. In a state where the gusset is fixed to the side member, interference between one of the horizontal plates of the gusset and parts of the second attachment members, which project toward the one of the horizontal plates from the horizontal wall of the side member, is avoided by the second recessed parts.

In the configuration described above, even if the component is also fixed to the horizontal wall of the side member by use of the second attachment members, interference between the second attachment members and the gusset is avoided by the second recessed parts defined by the second ribs. Specifically, the component such as the leaf spring bracket can be fixed to both of the vertical and horizontal walls of the side member without causing interference with the gusset. Thus, a stronger fixation state can be obtained.

Moreover, since one of the horizontal plates of the gusset is reinforced by the second ribs, it is possible to further increase the rigidity in the coupled portion of the side and cross members, particularly, the torsional rigidity in the direction of rotation about the cross member.

Furthermore, the second ribs in the horizontal plate may be formed continuously with the ribs on the vertical plate. Thus, compared to the case where the both ribs are formed to be separate from each other, a reinforcement effect thereof is significantly increased. Accordingly, rigidity of the gusset can be further improved.

BEST MODE FOR CARRYING OUT THE INVENTION

With reference to the drawings, an embodiment of the present invention will be described below.

Figure 1:
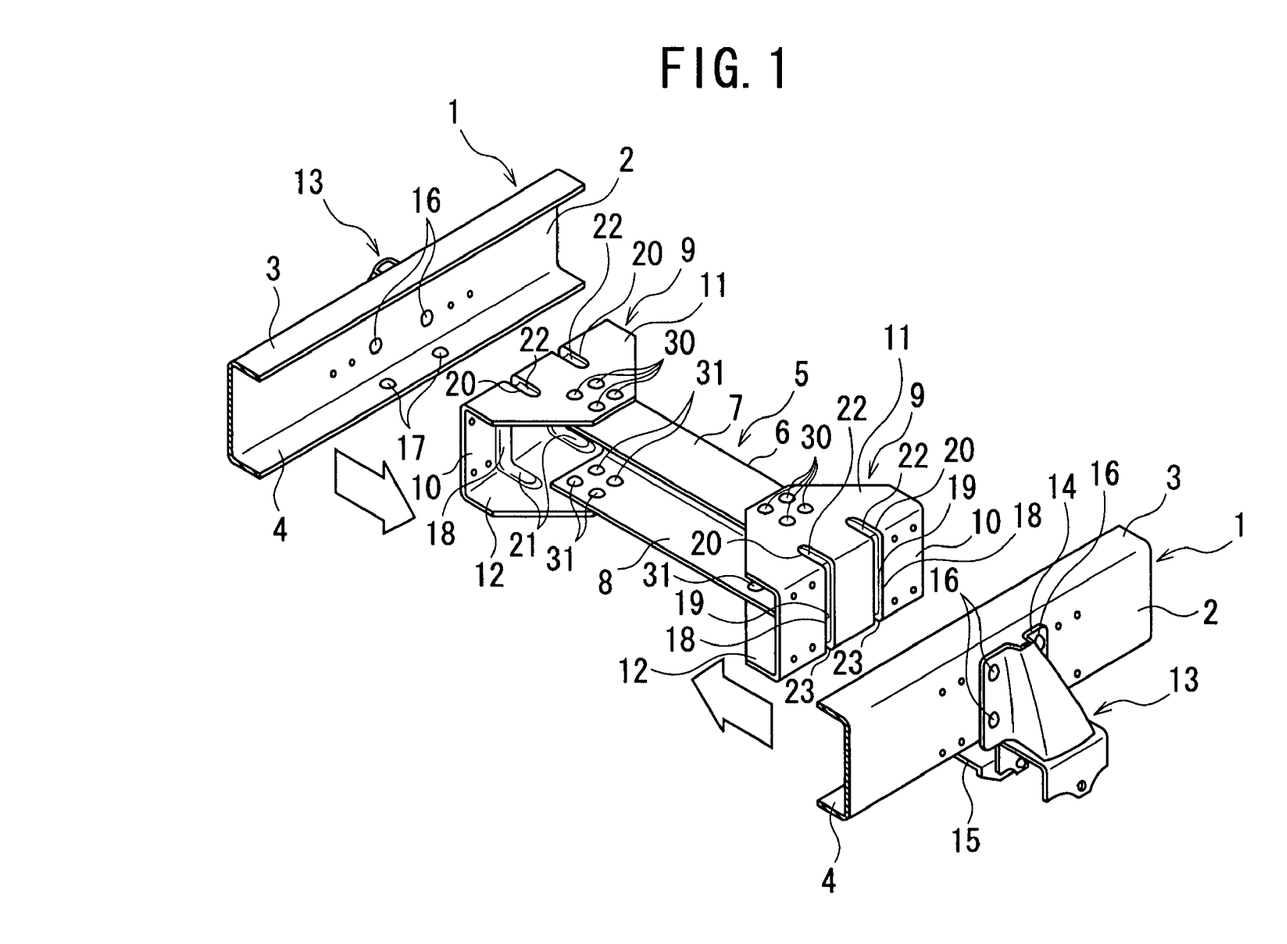
FIG. 1 is an exploded perspective view of a coupling structure according to an embodiment of the present invention.
Figure 2:
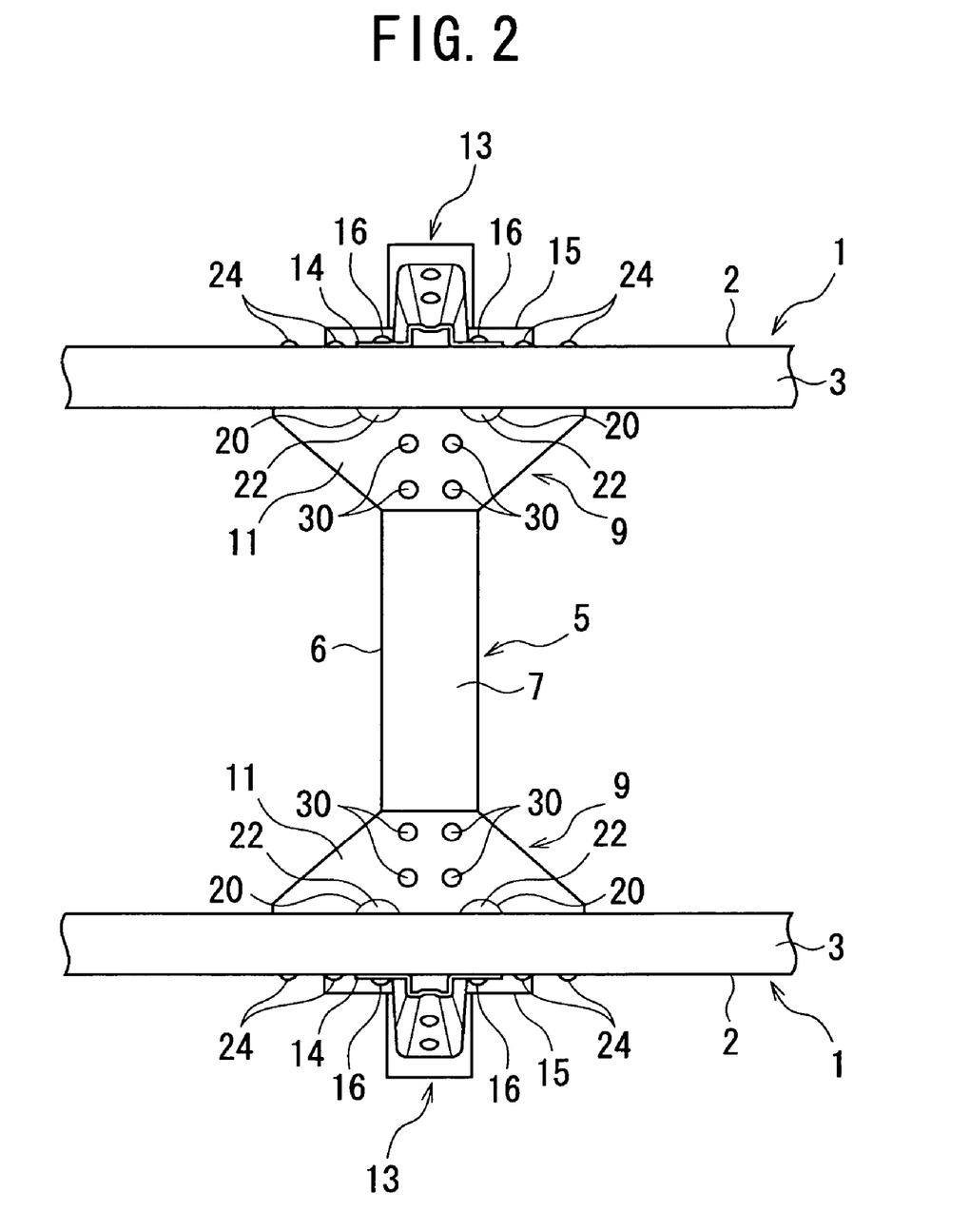
FIG. 2 is a plan view showing an assembled state of FIG. 1.
Figure 3:
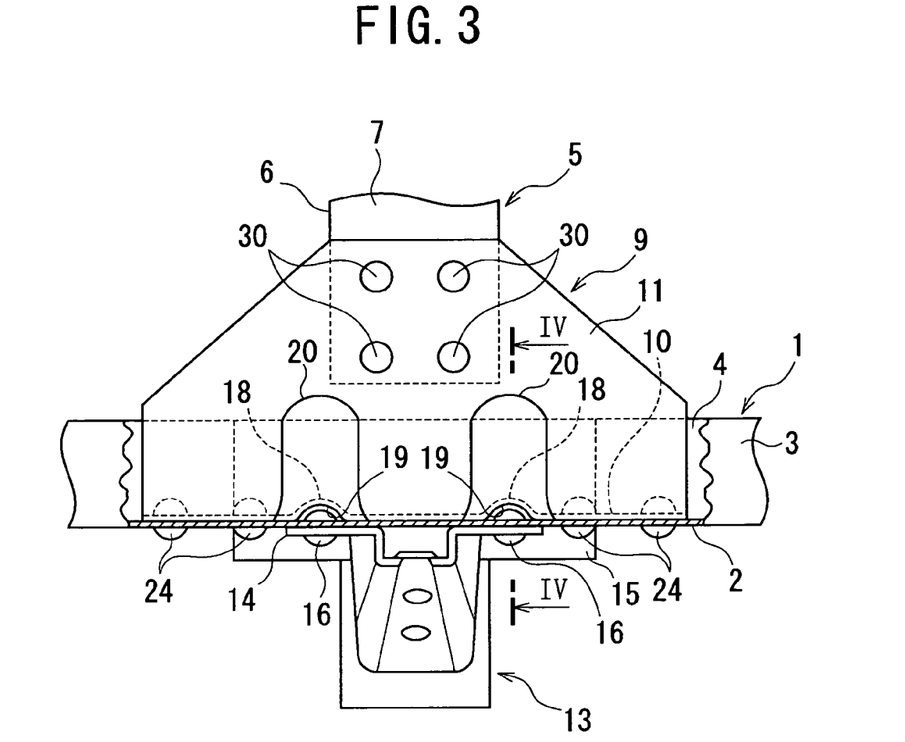
FIG. 3 is an enlarged view of a main part in which an upper horizontal plate of a side member shown in FIG. 2 is partially fractured.
Figure 4:
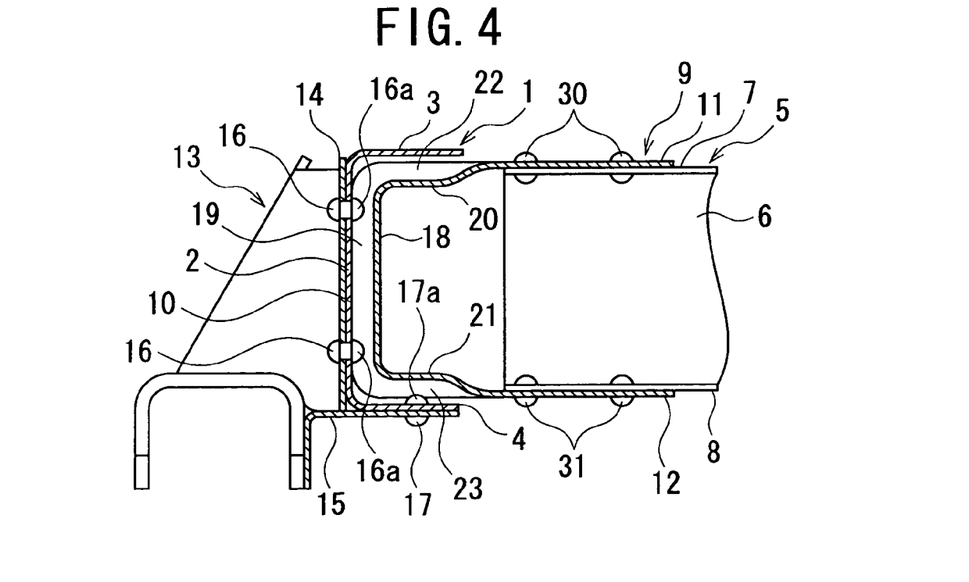
FIG. 4 is a cross-sectional view taken along the line IV-IV in FIG. 3.

FIG. 1 is an exploded perspective view of a coupling structure according to this embodiment. FIG. 2 is a plan view showing an assembled state of FIG. 1. FIG. 3 is an enlarged view of a main part in which an upper horizontal plate of a side member shown in FIG. 2 is partially fractured. FIG. 4 is a cross-sectional view taken along the line IV-IV in FIG. 3. Note that, in the following description, a longitudinal direction is a longitudinal direction of a vehicle body and a left/right direction is a left/right direction in a state of facing the front of the vehicle body.

As shown in FIGS. 1 and 2, in a lower part of a vehicle body of an automobile with a chassis frame, a pair of left and right side members 1 and a cross member 5 as the chassis frame are provided. The side members 1 extend along the longitudinal direction of the vehicle body at both sides of a vehicle transverse direction. The cross member 5 extends along the vehicle transverse direction. Each of the side members 1 has an approximately U-shaped cross section including a vertical wall 2 and two horizontal walls (upper horizontal wall 3 and lower horizontal wall 4). The upper and lower horizontal walls 3 and 4 are bent from upper and lower ends of the vertical wall 2, respectively, and extend inward in the vehicle transverse direction. The respective side members 1 are disposed so as to open inward in the vehicle transverse direction.

The cross member 5 has an approximately U-shaped cross section including a side wall 6 and upper and lower walls 7 and 8. The upper and lower walls 7 and 8 are bent from upper and lower ends of the side wall 6, respectively, and extend toward one end in the longitudinal direction of the vehicle body. The cross member 5 is disposed so as to open toward the one end in the longitudinal direction of the vehicle body between the two side members 1. Both left and right ends of the cross member 5 are coupled to the side members 1 by use of gussets 9.

Each of the gussets 9 has a vertical plate 10 and upper and lower horizontal plates (upper horizontal plate 11 and lower horizontal plate 12). The vertical plate 10 is fixed to the vertical wall 2 of the side member 1. The upper and lower horizontal plates 11 and 12 are bent from upper and lower ends of the vertical plate 10, respectively, extend inward in the vehicle transverse direction, and are fixed to the upper and lower walls 7 and 8 of the cross member 5, respectively. The upper and lower horizontal plates 11 and 12 of the gusset 9 are fixed to the cross member 5, by use of rivets 30 and 31, respectively, in a state of coming into surface contact with an upper surface of the upper wall 7 of the cross member 5 and a lower surface of the lower wall 8 of the cross member 5, respectively.

As shown in FIG. 4, a leaf spring bracket 13 for supporting a suspension mechanism (not shown) has upper and lower mounting plate parts 14 and 15. The upper mounting plate part 14 is fixed to an outer surface of the vertical wall 2 of the side member 1 in the vehicle transverse direction by use of rivets 16 as attachment members. The rivets 16 penetrate the vertical wall 2. The lower mounting plate part 15 is fixed to a lower surface of the lower horizontal wall 4 of the side member 1 by use of rivets 17 as second attachment members. The rivets 17 penetrate the lower horizontal wall 4. The vertical plate 10 of the gusset 9 and the upper mounting plate part 14 of the leaf spring bracket 13 face each other while sandwiching the vertical wall 2 of the side member 1 therebetween. The lower horizontal plate 12 of the gusset 9 and the lower mounting plate part 15 of the leaf spring bracket 13 face each other while sandwiching the lower horizontal wall 4 of the side member 1 therebetween. As described above, the leaf spring bracket 13 is fixed to a coupled portion of the side and cross members 1 and 5. This is in order to securely support the suspension mechanism by dispersing load acting thereon to the side and cross members 1 and 5.

As shown in FIG. 4, in the vertical plate 10 of the gusset 9, two ribs 18 protruding inward in the vehicle transverse direction are formed approximately linearly along a vertical direction. Each of the ribs 18 forms and defines a recessed part 19 having a groove shape on an outer surface of the vertical plate 10 in the vehicle transverse direction, the vertical plate 10 which faces the vertical wall 2 of the side member 1. Upper and lower ends of the rib 18 reach the upper and lower ends of the vertical plate 10. In the upper horizontal plate 11 of the gusset 9, two upper ribs 20 are formed. The respective upper ribs 20 protrude downward and extend from the upper ends of the respective ribs 18 continuously inward in the vehicle transverse direction and approximately linearly. Similarly, in the lower horizontal plate 12 of the gusset 9, two lower ribs 21 as second ribs are formed. The respective lower ribs 21 protrude upward and extend from the lower ends of the respective ribs 18 continuously inward in the vehicle transverse direction and approximately linearly. Each of the upper ribs 20 defines an upper recessed part 22 having a groove shape in an upper surface of the upper horizontal plate 11 facing the upper horizontal wall 3 of the side member 1. Each of the lower ribs 21 defines a lower recessed part 23 having a groove shape, as a second recessed part, in a lower surface of the lower horizontal plate 12 facing the lower horizontal wall 4 of the side member 1.

The recessed part 19 of each rib 18 is set to have a position and a size (width and depth) to surely house parts 16a of the rivets 16 fixing the side of the leaf spring bracket 13, the parts 16a projecting from the inner surface of the vertical wall 2 of the side member 1 in the vehicle transverse direction. Thus, the vertical plate 10 of the gusset 9 is fixed in a state of coming into surface contact with the inner surface of the vertical wall 2 of the side member 1 in the vehicle transverse direction without interfering with the rivets 16. Moreover, as shown in FIG. 3, the vertical wall 2 of the side member 1 is fixed to the vertical plate 10 of the gusset 9 by use of rivets 24 disposed at both sides of the leaf spring bracket 13 in the longitudinal direction of the vehicle body.

As shown in FIG. 4, the lower recessed part 23 of each of the lower ribs 21 is set to have a position and a size (width and depth) to surely avoid interference between the lower horizontal plate 12 and parts 17a of the rivets 17 fixing the lower part of the leaf spring bracket 13 in a state where the gusset 9 is fixed to the side member 1, the parts 17a projecting upward toward the lower horizontal plate 12 of the gusset 9 from the lower horizontal wall 4 of the side member 1.

Next, operations of this embodiment will be described.

In coupling the side member 1 to the cross member 5, as shown in FIG. 1, the upper and lower horizontal plates 11 and 12 of the gussets 9 are fixed to the both ends of the upper and lower walls 7 and 8 of the cross member 5 by use of the rivets 30 and 31. Thereafter, the upper and lower mounting plate parts 14 and 15 of the leaf spring brackets 13 are fixed to the outer surfaces of the vertical walls 2 of the side members 1 and the lower surfaces of the lower horizontal walls 4 thereof in the vehicle transverse direction by use of the rivets 16 and 17, respectively. Subsequently, by allowing the outer surfaces of the vertical plates 10 of the gussets 9 to abut on the inner surfaces of the vertical walls 2 of the side members 1 in the vehicle transverse direction, the vertical walls 2 and the vertical plates 10 are fixed by use of the rivets 24 (shown in FIGS. 2 and 3). In this event, as shown in FIG. 4, the parts 16a of the rivets 16, which project from the inner surface of the vertical wall 2 of the side member 1 in the vehicle transverse direction, are housed in the recessed parts 19 defined by the ribs 18. Thus, the vertical plate 10 of the gusset 9 comes into surface contact with the inner surface of the vertical wall 2 of the side member 1 in the vehicle transverse direction without interfering with the rivets 16. Consequently, a strong fixation state is obtained between the gussets 9 and the side members 1. Specifically, after the cross member 5 and the gussets 9 are assembled as one unit and the side member 1 and the leaf spring bracket 13 are assembled as one unit, the both units can be assembled and fixed. Therefore, in an assembly operation, it is not required to simultaneously assemble three or more of independent members and fix those members. Thus, assembly workability is improved.

Moreover, the side members 1 are coupled to the cross member 5 at each of both ends in the vehicle transverse direction by use of one gusset 9. In addition, the vertical plate 10 of the gusset 9 is reinforced by the ribs 18. Thus, without additionally requiring reinforcing members, it is possible to increase rigidity in the coupled portions of the side and cross members 1 and 5, particularly, torsional rigidity in a direction of rotation about the cross member 5. Therefore, for example, even in the case where an external force which twists the chassis frame acts on the vehicle while running, it is possible to surely prevent deformation of and damage to the coupled portions of the side and cross members 1 and 5.

Moreover, interference between the lower horizontal plate 12 and the parts 17a of the rivets 17, which project from the upper surface of the lower horizontal wall 4 of the side member 1, is avoided by the lower recessed parts 23 defined by the lower ribs 21. The leaf spring bracket 13 is fixed to both of the vertical wall 2 and the lower horizontal wall 4 of the side member 1 by use of the rivets 16 and 17. Thus, the leaf spring bracket 13 is more strongly supported by the side member 1.

Furthermore, the upper and lower horizontal plates 11 and 12 of the gusset 9 are reinforced by the upper and lower ribs 20 and 21, respectively. Thus, the rigidity in the coupled portions of the side and cross members 1 and 5, particularly, the torsional rigidity in the direction of rotation about the cross member 105 is further increased. Particularly, in this embodiment, the upper and lower ribs 20 and 21 extend continuously from the upper and lower ends of the ribs 18, respectively. Thus, compared to the case where the respective ribs 18, 20 and 21 are formed to be separate from each other, a reinforcement effect thereof is significantly increased. Accordingly, rigidity of the entire gusset 9 is further improved.

As described above, by use of the coupling structure of the side and cross members 1 and 5 according to this embodiment, it is possible to simultaneously achieve ensuring of sufficient rigidity and improvement in the assembly workability without inducing a complication and an increase in weight of the structure attributable to reinforcement.

Note that, although, in this embodiment, the ribs 18 in the vertical plate 10 of the gusset 9 are formed approximately linearly along the vertical direction, the present invention is not limited thereto. For example, the direction of the ribs 18 may be set to the longitudinal direction of the vehicle body or an oblique direction. However, from the viewpoint of improvement in the rigidity of the entire gusset 9, it is desirable that the ribs in the vertical plate 10 of the gusset 9 are formed continuously with the upper ribs of the upper horizontal plate 11 and the lower ribs of the lower horizontal plate 12. In consideration of this circumstance, it is preferable that the direction of the ribs in the vertical plate 10 is the vertical direction as in this embodiment.

Moreover, although, as both of the attachment members and the second attachment members, the rivets 16 and 17 are used, the present invention is not limited thereto. For example, bolts, nuts and the like may be used.

Moreover, although the leaf spring bracket 13 is fixed to the lower horizontal wall 4 of the side member 1, instead thereof or in addition thereto, the leaf spring bracket 13 may be fixed to the upper horizontal wall 3 of the side member 1. In this case, a structure may be formed, as in the case of fixing the leaf spring bracket 13 to the lower horizontal wall 4, so as to avoid interference between the upper horizontal plate 11 of the gusset 9 and the parts of the attachment members (for example, the rivets) for fixing the leaf spring bracket 13 to the upper horizontal wall 3, the parts projecting downward from the lower surface of the upper horizontal wall 3 of the side member 1, by use of the upper recessed parts 22 defined by the upper ribs 20.

Furthermore, in this embodiment, the description was given of the leaf spring bracket 13 as the component to be fixed to the side member 1. However, even if other components are fixed to the side member 1, the present invention is applicable.

As described above, according to the present invention, it is possible to obtain a coupling structure of side and cross members, which is capable of providing sufficient rigidity without inducing an increase in weight and a complication of the structure and providing excellent assembly workability.

Lastly, the embodiment described above is one example of the present invention. Thus, the present invention is not limited to the embodiment described above. It should be added that, needless to say, various changes according to designs and the like are possible even in those other than the embodiment described above without departing from the technical idea according to the present invention.

INDUSTRIAL APPLICABILITY

The present invention is widely applicable to a coupling structure of side and cross members which form a chassis frame of a vehicle body.

The invention claimed is:

1. A coupling structure of side and cross members, comprising:

a side member having a vertical wall and being disposed along a longitudinal direction of a vehicle body;

a component fixed to an outer surface of the vertical wall of the side member in a vehicle transverse direction by use of attachment members penetrating the vertical wall;

a cross member having a side wall, an upper wall extending from an upper end of the side wall, and a lower wall extending from a lower end of the side wall, the cross member being disposed along the vehicle transverse direction; and a gusset having a vertical plate fixed to the vertical wall of the side member, an upper horizontal plate that extends inward in the vehicle transverse direction from an upper end of the vertical plate and is fixed to the upper wall of the cross member, and a lower horizontal plate that extends inward in the vehicle transverse direction from a lower end of the vertical plate and is fixed to the lower wall of the cross member, the gusset coupling an end of the cross member in the vehicle transverse direction with the side member, wherein the vertical plate of the gusset has ribs protruding inward in the vehicle transverse direction, the ribs form and define recessed parts on an outer surface of the vertical plate in the vehicle transverse direction, and parts of the attachment members, which project from an inner surface of the vertical wall of the side member in the vehicle transverse direction, are housed in the recessed parts and therefore the vertical plate of the gusset is fixed in a state of coming into surface contact with the inner surface of the vertical wall of the side member in the vehicle transverse direction.

2. The coupling structure according to claim 1, wherein the side member includes a horizontal wall extending inward in the vehicle transverse direction from one of upper and lower ends of the vertical wall and facing one of the upper and lower horizontal plates of the gusset, the component is fixed to the horizontal wall of the side member by use of second attachment members penetrating the horizontal wall, the one of the upper and lower horizontal plates of the gusset has second ribs protruding in an opposite direction to the horizontal wall, the second ribs form and define second recessed parts on a surface facing the horizontal wall, and in a state where the gusset is fixed to the side member, interference between the one of the upper and lower horizontal plates of the gusset and parts of the second attachment members projecting toward the one of the upper and lower horizontal plates from the horizontal wall of the side member, is avoided by the second recessed parts.

3. The coupling structure according to claim 2, wherein the ribs in the vertical plate of the gusset are joined with the second ribs in the horizontal plate.

4. The coupling structure according to one of claims 1 and 2, wherein the component is a leaf spring bracket.

* * * * *